(12) United States Patent
Venkateswaran et al.

(10) Patent No.: US 12,739,042 B2
(45) Date of Patent: Sep. 15, 2026

(54) CALIBRATION OF TRANSMIT ANTENNA CHAINS AND RECEIVE ANTENNA CHAINS OF AN ANTENNA SYSTEM

(71) Applicant: Telefonaktiebolaget LM Ericsson (publ), Stockholm (SE)

(72) Inventors: Vijay Venkateswaran, Västerås (SE); Bo Göransson, Sollentuna (SE); Joao Vieira, Hjärup (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 576 days.

(21) Appl. No.: 18/267,737

(22) PCT Filed: Dec. 22, 2020

(86) PCT No.: PCT/SE2020/051254
§ 371 (c)(1),
(2) Date: Jun. 15, 2023

(87) PCT Pub. No.: WO2022/139639
PCT Pub. Date: Jun. 30, 2022

(65) Prior Publication Data

US 2024/0072911 A1 Feb. 29, 2024

(51) Int. Cl.
*H04B 17/19* (2015.01)
*H01Q 3/26* (2006.01)
(Continued)

(52) U.S. Cl.
CPC ............. *H04B 17/19* (2015.01); *H01Q 3/267* (2013.01); *H04B 17/12* (2015.01); *H04B 17/21* (2015.01); *H04B 17/221* (2023.05)

(58) Field of Classification Search
CPC ...... H04B 17/19; H04B 17/17; H04B 17/221; H01Q 3/267
See application file for complete search history.

(56) References Cited

U.S. PATENT DOCUMENTS 6,037,898 A 3/2000 Parish et al.
8,422,540 B1 4/2013 Negus et al.
(Continued)

FOREIGN PATENT DOCUMENTS

EP 1 133 836 B1 11/2013
EP 2816739 A1 12/2014
(Continued)

OTHER PUBLICATIONS

International Search Report and the Written Opinion of the International Searching Authority, issued in corresponding International Application No. PCT/SE2020/051254, dated Sep. 29, 2021, 14 pages.

(Continued)

*Primary Examiner* — Junpeng Chen
(74) *Attorney, Agent, or Firm* — Rothwell, Figg, Ernst & Manbeck, P.C.

(57) ABSTRACT

There is provided mechanisms for calibrating transmit antenna chains and receive antenna chains of an antenna system. A method is performed by a network node. The method comprises obtaining a set of observations from bi-directional sounding of pairs of antennas of the antenna system. Each of the antennas has one transmit antenna chain and one receive antenna chain. The observations are represented by a composite product of transmit calibration weights, receive calibration weights, and signal leakage terms. The method comprises estimating the transmit calibration weights and the receive calibration weights from a decomposition of the composite product. The method comprises calibrating the transmit antenna chains and the receive antenna chains by applying as calibration factors the estimated transmit calibration weights to the transmit antenna chains and the receive calibration weights to the receive antenna chains.

16 Claims, 7 Drawing Sheets

(51) Int. Cl.
*H04B 17/12* (2015.01)
*H04B 17/21* (2015.01)

(56) References Cited

U.S. PATENT DOCUMENTS

| | | | | |
|---|---|---|---|---|
| 2005/0227628 | A1* | 10/2005 | Inanoglu | H04B 17/21 455/67.11 |
| 2007/0099573 | A1 | 5/2007 | Naguib et al. | |
| 2009/0093222 | A1 | 4/2009 | Sarkar | |
| 2009/0296849 | A1* | 12/2009 | Tanaka | H04L 25/022 375/295 |
| 2013/0122956 | A1* | 5/2013 | Lee | H04B 17/19 455/522 |
| 2015/0118980 | A1* | 4/2015 | Leung | H04B 17/14 455/114.2 |
| 2015/0341096 | A1 | 11/2015 | Gao et al. | |
| 2020/0252056 | A1 | 8/2020 | Alsuhaili | |
| 2021/0076370 | A1* | 3/2021 | Bengtsson | H04W 72/23 |

FOREIGN PATENT DOCUMENTS

| | | | |
|---|---|---|---|
| JP | 4557429 | B2 | 10/2010 |
| WO | 20070056672 | A2 | 5/2007 |
| WO | 2011148341 | A1 | 12/2011 |
| WO | 2020244783 | A1 | 12/2020 |

OTHER PUBLICATIONS

Gazor et al. “Communications over the Best Singular Mode of a Reciprocal MIMO Channel” IEEE Transactions on Communications, vol. 58 No. 7, Jul. 2010; pp. 1993-2001.

Dang et al. “Internal Reciprocity Calibration for TDD Massive MIMO: An Algorithm and Experimental Results” 2018 International Conference on Advanced Technologies for Communications; pp. 270-275.

Qualcomm Europe 3GPP TSG RAN 1 #52; Feb. 11-15, 2008 “Calibration Procedures for TDD Beamforming” 3GPP Draft; R1-080659, 3rd Generation Partnership Project (3GPP), 6 pages.

* cited by examiner

CALIBRATION OF TRANSMIT ANTENNA CHAINS AND RECEIVE ANTENNA CHAINS OF AN ANTENNA SYSTEM

CROSS REFERENCE TO RELATED APPLICATION(S)

This application is a 35 U.S.C. § 371 National Phase Entry Application from PCT/SE2020/051254, filed Dec. 22, 2020, designating the United States, the disclosure of which is incorporated herein by reference in its entirety.

TECHNICAL FIELD

Embodiments presented herein relate to a method, a network node, a computer program, and a computer program product for calibrating transmit antenna chains and receive antenna chains of an antenna system.

BACKGROUND

Advanced Antenna systems (AAS) enable beamforming for massive multiple input multiple output (MIMO) communication systems operating at high frequency bands, such as millimeter waves (mmW) bands. Such antenna systems typically require high quality hardware calibration in order to, e.g., be able to beamform most of the transmit energy into specific angles, in order to re-establish some degree of channel reciprocity, etc.

One type of calibration involves conducting the entire calibration procedure solely at the equipment under test, i.e., the node to be calibrated (e.g., the gNB), without involving the other end of the link (e.g., a user equipment or dedicated test equipment). Since only one part of the link is involved in the calibration procedure, this approach can only ensure a certain level of calibration requirements but has the advantage of not involving the other side of the link the calibration process. Nevertheless, the degree of calibration obtained is usually still sufficient for the purpose at hand, e.g., transmit antenna chain and receive antenna chain calibration for angle-based (or DFT-based) beamforming.

In a first example, this type of calibration is to be executed by means of utilizing an internal calibration network, where a reference transceiver unit transmits and receives signals to and from all transceivers (e.g., all transmit antenna chains and receive antenna chains) to be calibrated. The received signals are then post-processed for proper calibration coefficients to be estimated.

In a second example. this type of calibration is be executed by means of over-the-air signaling between some/all pairs of antennas of the node to be tested. In this example the need of internal networks only dedicated for calibration is bypassed. The received signals are then post-processed for proper calibration coefficients to be estimated.

The post-processing typically involves finding an initial solution of the calibration coefficients and the iteratively improving the initial solution. Iterative techniques are commonly optimized for systems where the dominant source of noise is additive Gaussian noise. Although yielding reasonably good calibration coefficients, there could be challenges related to the robustness of the iterative technique.

Hence, there is still a need for an improved calibration of transmit antenna chains and receive antenna chains of an antenna system.

SUMMARY

An object of embodiments herein is to provide efficient calibration of transmit antenna chains and receive antenna chains of an antenna system, whilst avoiding the challenges that might occur for iterative techniques.

According to a first aspect there is presented a method for calibrating transmit antenna chains and receive antenna chains of an antenna system. The method is performed by a network node. The method comprises obtaining a set of observations from bi-directional sounding of pairs of antennas of the antenna system. Each of the antennas has one transmit antenna chain and one receive antenna chain. The observations are represented by a composite product of transmit calibration weights, receive calibration weights, and signal leakage terms. The method comprises estimating the transmit calibration weights and the receive calibration weights from a decomposition of the composite product. The method comprises calibrating the transmit antenna chains and the receive antenna chains by applying as calibration factors the estimated transmit calibration weights to the transmit antenna chains and the receive calibration weights to the receive antenna chains.

According to a second aspect there is presented a network node for calibrating transmit antenna chains and receive antenna chains of an antenna system. The network node comprises processing circuitry. The processing circuitry is configured to cause the network node to obtain a set of observations from bi-directional sounding of pairs of antennas of the antenna system. Each of the antennas has one transmit antenna chain and one receive antenna chain. The observations are represented by a composite product of transmit calibration weights, receive calibration weights, and signal leakage terms. The processing circuitry is configured to cause the network node to estimate the transmit calibration weights and the receive calibration weights from a decomposition of the composite product. The processing circuitry is configured to cause the network node to calibrate the transmit antenna chains and the receive antenna chains by applying as calibration factors the estimated transmit calibration weights to the transmit antenna chains and the receive calibration weights to the receive antenna chains.

According to a third aspect there is presented a network node for calibrating transmit antenna chains and receive antenna chains of an antenna system. The network node comprises an obtain module configured to obtain a set of observations from bi-directional sounding of pairs of antennas of the antenna system. Each of the antennas has one transmit antenna chain and one receive antenna chain. The observations are represented by a composite product of transmit calibration weights, receive calibration weights, and signal leakage terms. The network node comprises an estimate module configured to estimate the transmit calibration weights and the receive calibration weights from a decomposition of the composite product. The network node comprises a calibrate module configured to calibrate the transmit antenna chains and the receive antenna chains by applying as calibration factors the estimated transmit calibration weights to the transmit antenna chains and the receive calibration weights to the receive antenna chains.

According to a fourth aspect there is presented a computer program for calibrating transmit antenna chains and receive antenna chains of an antenna system, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient calibration of transmit antenna chains and receive antenna chains of an antenna system, whilst avoiding the challenges noted above.

Advantageously, these aspects do not need array manifold or a calibration coupler network to obtain the observations. In turn, this enables low overall hardware complexity and cost for implementing the estimation of the transmit calibration weights and receive calibration weights.

Advantageously, these aspects allow for dynamically improving the performance for cases with imperfect antenna array knowledge and strong leakage.

Advantageously, these aspects provide efficient calibration of transmit antenna chains and receive antenna chains of a massive MIMO setup with multiple transmit antenna chains and receive antenna chains.

Advantageously, by exploiting the antenna array setup to simultaneously combine multiple observations and by exploiting the inherent properties of the observations, these aspects yield a high-resolution calibration of the transmit antenna chains and the receive antenna chains.

Advantageously, these aspects provide mathematically optimal calibration of the transmit antenna chains and receive antenna chains of an antenna system.

Advantageously, singular value decomposition (SVD), or a similar basis decomposition method, can be applied to the composite product of transmit calibration weights and receive calibration weights, yielding optimal basis vectors and hence optimal transmit calibration weights and optimal receive calibration weights.

Advantageously, for a given composite product of transmit calibration weights and receive calibration weights, these aspects provide a one-shot estimation algorithm, without necessity for iterations leading to optimal solution with shortest convergence time possible.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional. In general bold type face is used throughout this disclosure to denote vectors and matrices.

Figure 1:
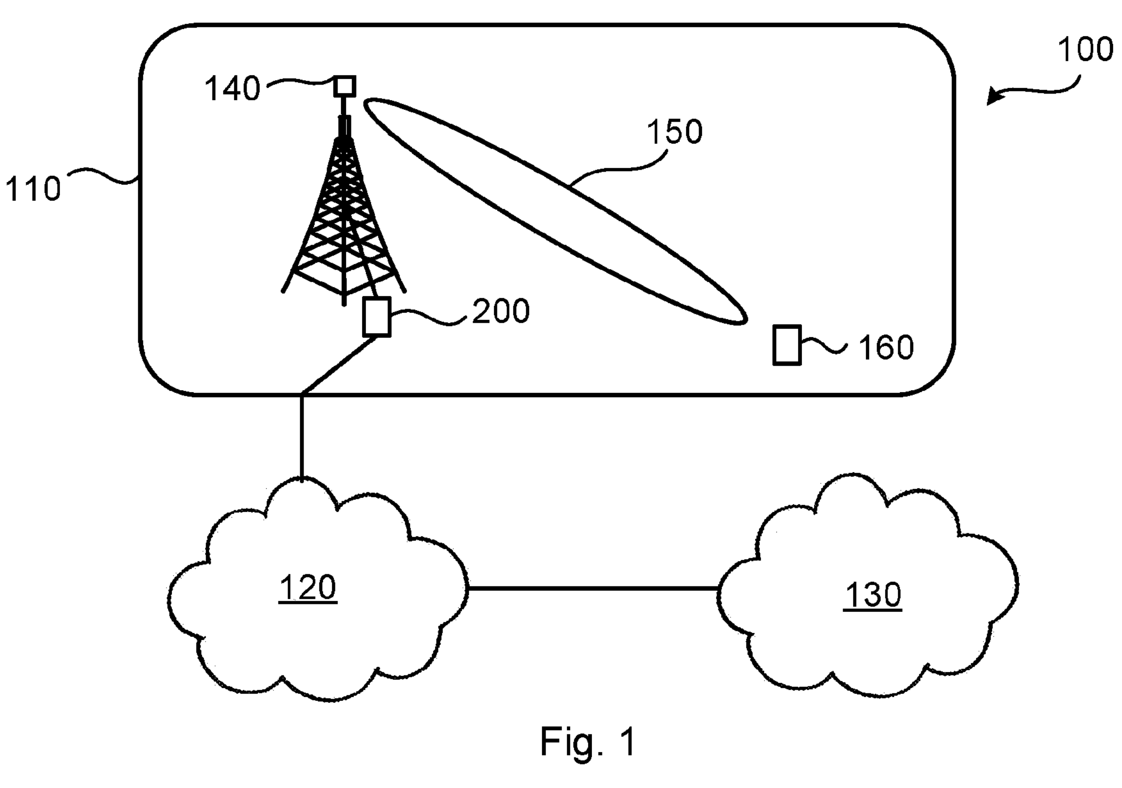
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, a fifth generation (5G) telecommunications network, or any evolvement thereof, and support any 3GPP telecommunications standard, where applicable.

The communication network 100 comprises a network node 200 configured to provide network access to user equipment, as represented by user equipment 160, in a radio access network 110. The radio access network 110 is operatively connected to a core network 120. The core network 120 is in turn operatively connected to a service network 130, such as the Internet. The user equipment 160 is thereby enabled to, via the network node 200, access services of, and exchange data with, the service network 130.

The network node 200 comprises, is collocated with, is integrated with, or is in operational communications with, an antenna system 140. The network node 200 (via its antenna system 140) and the user equipment 160 are configured to communicate with each other in beams, one of which is illustrated at reference numeral iso. In this respect, beams that could be used both as transmit beams and receive beams will hereinafter simply be referred to as beams.

Examples of network nodes 200 are radio access network nodes, radio base stations, base transceiver stations, Node Bs, evolved Node Bs, gNBs, access points, access nodes, and backhaul nodes. Examples of user equipment 160 are terminal devices, wireless devices, mobile stations, mobile phones, handsets, wireless local loop phones, smartphones, laptop computers, tablet computers, network equipped sensors, network equipped vehicles, and so-called Internet of Things devices.

As noted above there is still a need for an improved calibration of transmit antenna chains and receive antenna chains of an antenna system 140. In further detail, although yielding reasonably good calibration coefficients, for iterative techniques there could be challenges related to the robustness of the iterative technique due to inter-transceiver leakage.

The embodiments disclosed herein therefore relate to mechanisms for calibrating transmit antenna chains and receive antenna chains of an antenna system 140. In order to obtain such mechanisms there is provided a network node 200, a method performed by the network node 200, a computer program product comprising code, for example in the form of a computer program, that when run on a network node 200, causes the network node 200 to perform the method. The overall objective is to calibrate the transmit antenna chains and receive antenna chains without using a calibration network by exploiting the mutual coupling between the antennas.

Figure 2:
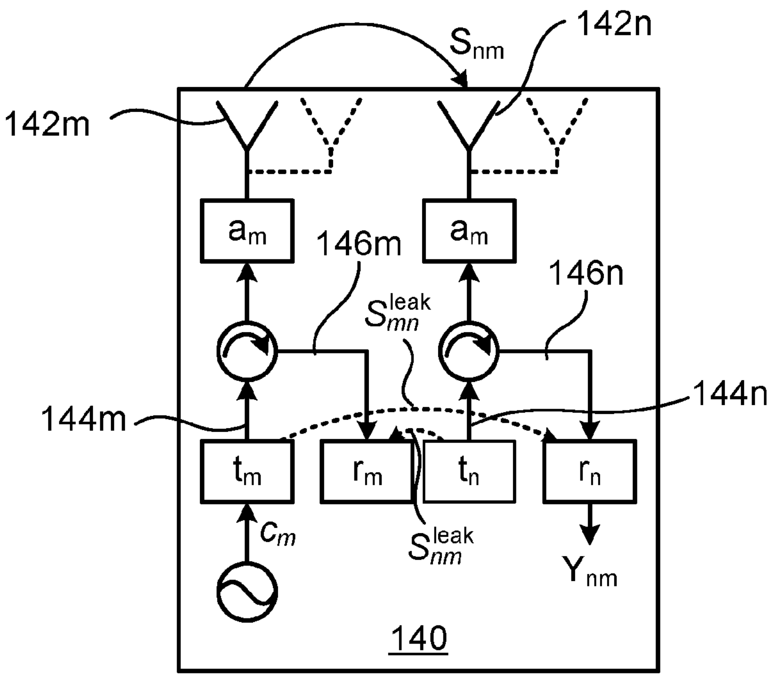
FIG. 2 schematically illustrates an antenna system according to an embodiment.

FIG. 2 schematically illustrates the antenna system 140 according to an embodiment. The antenna system 140 comprises transmit antenna chains 144*m*, 144*n* and receive antenna chains 146*m*, 146*n*. The transmit antenna chains 144*m*, 144*n* and receive antenna chains 146*m*, 146*n* are connected to antennas 142*m*, 142*n* for transmission and reception of signals over the air interface. In some embodiments, there are two or more individual antennas 142*m*, 142*n* per each transmit antenna chains 144*m*, 144*n* and receive antenna chains 146*m*, 146*n* and the two or more individual antennas 142*m*, 142*n* per each transmit antenna chains 144*m*, 144*n* and receive antenna chains 146*m*, 146*n* form an antenna array. Alternatively, all antennas 142*m*, 142*n* collectively define one single antenna array and the two or more individual antennas 142*m*, 142*n* per each transmit antenna chains 144*m*, 144*n* and receive antenna chains 146*m*, 146*n* form a sub-array of the antenna array. Each such antenna array or sub-array could correspond to one antenna port. The terms antenna, antenna array, sub-array, and antenna port can therefore hereinafter be used interchangeably.

With reference to FIG. 2, the overall objective can be formulated as how to estimate the complex-valued gains of the N transmit antenna chains 144*m*, 144*n* and receive antenna chains 146*m*, 146*n*, namely, $t_n$, $r_n$, $\forall n \in \{1, \ldots, N\}$. Individual antenna elements response $a_m$, $a_n$ (i.e., one response per each antenna array or antenna port) are assumed to be approximately known or included within the complex-valued gains and accounted in calibration, since they can also be measured in a factory pre-calibration.

In FIG. 2, $S_{nm}$ denotes to the S parameters (where S is short for scattering) between transmit antenna m and receive antenna n. Typically, $S_{nm}$ is dominated by mutual coupling between nearby transmit and receive antenna elements. As a non-limiting example, for a one-dimensional linear array with antenna elements indexed from one end to the other this would correspond to that the value of n is close to the value of m. It can be assumed that $S_{nm}$ is approximately known or given our design setup, since the value of $S_{nm}$ can be measured in during a factory pre-calibration. In practice, the actual coupling of signals between transmit antenna m and receive antenna n elements will also include unknown leakage and hence the actual S parameter, $S'_{nm}$, can be expressed as $S'_{nm}=S_{nm}(1+\Delta_{nm})$ where $\Delta_{nm}$ is a leakage term between transmit antenna m and receive antenna n. This leakage typically occurs when a transmit antenna chain is physically close to a receive antenna chain, and thus the received signal is not only due to the mutual coupling part of the channel, but also due to undesired transceiver leakage.

In addition to leakage, there can also be unknown process variations since the expected S parameters will be different from actual S parameters. This may happen when pre-calibration is performed for one single antenna element, or antenna array, and expect that the S parameters of the other antenna elements, or antenna arrays, to be similar.

Consider that antenna system 140 is configured for operation in a time division duplex (TDD) mode, i.e. to utilize transmit and receive modes with same carrier frequency. A known pilot signal, denoted $c_m$, is transmitted in digital baseband (frequency/time domain) from transmit antenna m and received at antenna n. The received signal at antenna n can then be written as:

$$x_{nm} = r_n S'_{nm} t_m c_m + w_{nm},$$

where $w_{nm}$ denotes additive noise.

Note that a single signal $c_m$ transmitted from antenna m is received by all n antennas, $n \in \{1, \ldots, N\}$, $n \neq m$. There are thus N−1 observations and for the known pilot, these signals, the combined transmit, receive and S parameter channel is obtained by average cross correlation of the received signals with pilot sequence corrupted by noise:

$$y_{nm} = E\{(r_n S'_{nm} t_m c_m + w_{nm}) \cdot \bar{c}_m\} \Rightarrow y_{nm} \approx r_n S'_{nm} t_m, \quad (1)$$

where it assumed that the pilot signal is uncorrelated with the noise term. In expression (1), $\bar{c}_m$ denotes the complex conjugate of $c_m$.

Figure 3:
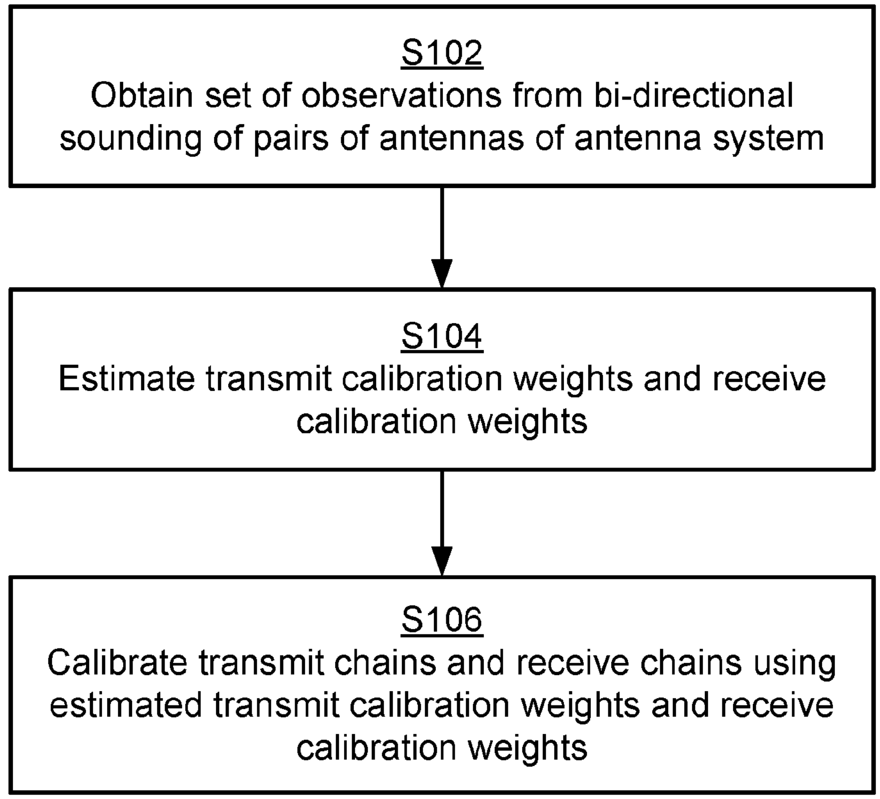
FIGS. 3 and 4 are flowcharts of methods according to embodiments.

FIG. 3 is a flowchart illustrating embodiments of methods for calibrating transmit antenna chains 144*m*, 144*n* and receive antenna chains 146*m*, 146*n* of an antenna system 140. The methods are performed by the network node 200. The methods are advantageously provided as computer programs 920.

The method is based on exploiting the mutual coupling between antenna elements of transmit antenna chains and antenna elements of receive antenna chains. The method therefore involves post-processing a set of received observations, obtained from bi-directional sounding of at least some pairs of antennas 142*m*, 142*n* of the antenna system 140, in order to estimative suitable calibration coefficients. Hence, the network node 200 is configured to perform action S102:

S102: The network node 200 obtains a set of observations from bi-directional sounding of pairs of antennas 142*m*, 142*n* of the antenna system 140. Each of the antennas 142*m*, 142*n* has one transmit antenna chain 144*m*, 144*n* and one receive antenna chain 146*m*, 146*n*. The observations are represented by a composite product Z of transmit calibration weights, receive calibration weights, and signal leakage terms.

The observations contain a composite product of the transmit and receive calibration weights that are to be estimated. Hence, the network node 200 is configured to perform action S104:

S104: The network node 200 estimates the transmit calibration weights and the receive calibration weights from a decomposition of the composite product Z.

The estimate of the transmit calibration weights and receive calibration weights are then applied to ensure phase and amplitude alignment of transmit antenna chains 144*m*,

144$n$ and the receive antenna chains 146$m$, 146$n$. Hence, the network node 200 is configured to perform action S106:

S106: The network node 200 calibrates the transmit antenna chains 144$m$, 144$n$ and the receive antenna chains 146$m$, 146$n$ by applying as calibration factors the estimated transmit calibration weights to the transmit antenna chains 144$m$, 144$n$ and the receive calibration weights to the receive antenna chains 146$m$, 146$n$.

Embodiments relating to further details of calibrating transmit antenna chains 144$m$, 144$n$ and receive antenna chains 146$m$, 146$n$ of an antenna system 140 as performed by the network node 200 will now be disclosed.

The method as defined by actions S102, S104, and S106 can be applied in any frequency band; one occurrence of actions S102, S104, and S106 can be applied in each frequency band of interest. Hence, wideband calibration can be achieved by repeating actions S102, S104, and S106 over different parts of the frequency band, for example over different sub-bands across a wide frequency band or over distinct frequency bands that define a multi-band wideband antenna system.

In some embodiments, the composite product Z is composed of normalized cross-correlation terms obtained for a set of antennas 142$m$, 142$n$ of the antenna system 140, wherein each normalized cross-correlation term represents bi-directional sounding of a respective pair of antennas 142$m$, 142$n$ of the antenna system 140. In some aspects, the observations are obtained at receive antenna chains 146$m$, 146$n$ due to mutual coupling and leakage between the antennas 142$m$, 142$n$ of the antenna system 140. Let normalized cross-correlation term $z_{nm}$ represent the normalized cross-correlation between antenna n and antenna m of the antenna system 140 for transmission of a signal $c_m$ from antenna m and reception of the signal $c_m$ at antenna n. In some embodiments, the signal $c_m$ is dedicated for the bi-directional sounding.

Due to the mutual coupling between transmit antenna m and receive antenna n, the averaged cross correlation is $$y_{nm} \approx r_n S'_{nm} t_m.$$

Denote by $z_{nm}$ the cross-correlation normalized by the S parameters (i.e., by $S_{nm}$). Then, $z_{nm}$ can be expressed as follows:

$$z_{nm} = \frac{y_{nm}}{s_{nm}} = r_n(1 + \Delta_{nm})t_m. \tag{2}$$

Hence, in some embodiments, the normalized cross-correlation term $z_{nm}$ is a function of transmit gain value $t_m$ of antenna m, receive gain value $r_n$ of antenna n, and the signal leakage term $\Delta_{nm}$ between antenna n and antenna m.

As noted above, the objective is to estimate $t_m$ and $r_n$. In expression (2), however, there is one observation and two unknowns, and thus no unique solution can be found. The same procedure is therefore repeated for further receive antennas n for the same transmit antenna m. If the procedure, for transmit antenna m, is repeated for the other N−1 receive antennas, these cross-correlation terms can be stacked as a N−1×1 vector. For transmit antenna 1, stacking all possible observations leads to an N×1 vector $z_1$:

$$z_1 = \begin{bmatrix} r_1 \\ r_2 \\ \vdots \\ r_N \end{bmatrix} \text{Diag}\begin{bmatrix} 0 \\ 1+\Delta_{21} \\ \vdots \\ 1+\Delta_{N1} \end{bmatrix} (t_1).$$

The notation Diag(x) denotes a diagonal matrix formed from the vector x. That is, $$\text{Diag}\begin{bmatrix} x_1 \\ x_2 \\ \vdots \\ x_N \end{bmatrix}$$

is a diagonal matrix with elements $x_1, x_2, \ldots, x_N$ on its diagonal. Similarly, an N×1 vector can be obtained for all transmit antennas $t_m$ $m \in \{1, \ldots, N\}$. That is:

$$z_m = \begin{bmatrix} r_1 \\ r_2 \\ \vdots \\ r_N \end{bmatrix} \text{Diag}\begin{bmatrix} 1+\Delta_{1m} \\ 1+\Delta_{2m} \\ \vdots \\ 1+\Delta_{Nm} \end{bmatrix} (t_m). \tag{3}$$

In expression (3) there is a zero at row m in the leakage term vector.

Stacking all column vectors and keeping the diagonal elements as non-zero yields an N×N matrix Z:

$$Z = [\, z_1 \;\; z_2 \;\; \cdots \;\; z_N \,] = \text{Diag}\begin{bmatrix} r_1 \\ r_2 \\ \vdots \\ r_N \end{bmatrix} \begin{bmatrix} 0 & 1+\Delta_{12} & \cdots & 1+\Delta_{1N} \\ 1+\Delta_{21} & \ddots & \ddots & \vdots \\ \vdots & \ddots & \ddots & 1+\Delta_{N-1N} \\ 1+\Delta_{N1} & 1+\Delta_{N1} & \cdots & 0 \end{bmatrix} \text{Diag}\begin{bmatrix} t_1 \\ t_2 \\ \vdots \\ t_N \end{bmatrix} \Leftrightarrow Z = D_r[1-(I-\Delta)]D_t, \tag{4}$$

where I is an N×N identity matrix, and 1 is a matrix will ones in all of its entries. Further, $D_t$ and $D_r$ are diagonal matrices containing the transmit and receive terms that are to be estimated and $\Delta$ corresponds to the leakage terms between the transmit antennas and the receive antennas. Hence, in some embodiments, the composite product Z is a matrix with the observations stacked either as columns or rows.

The leakage terms $\Delta_{nm}$ are assumed to be independent of S parameters values. Note that $S_{nm}=S_{mn}$ since the S parameters made of passive antenna elements can be assumed to be reciprocal. However, no such reciprocity assumption is made for the leakage terms $\Delta_{nm}$ since, as shown in FIG. 2, where $$S_{nm}^{leak} = S_{nm}\Delta_{nm},$$

the leakage between two transceivers can take two distinct paths depending on which transmitter/receiver pair is activated.

For the special case where the leakage terms is small i.e. $\|\Delta_{nm}\| << 1$, then most of the energy of $1-(I-\Delta)$ is concentrated in one dimension and thus $1-(I-\Delta)$ can be approximated as close to a rank 1 matrix. For example, simulations indicate that when N=32, approximately 96% of the energy is confined to one dimension of 1−(I−Δ).

From expression (4) follows that:

$$Z=D_r[1-(I-\Delta)]D_t=D_r(1-I)D_t+D_r\Delta D_t. \quad (5)$$

Assume that $\|\Delta_{nm}\|<<1$ and let $\epsilon=D_r\Delta D_t$. Then expression (5) can be rewritten as:

$$Z=D_r(1-I)D_t+\epsilon. \quad (6)$$

Assuming that the leakage term is small, i.e. $\|\Delta_{nm}\|<<1$, the matrix Z can be approximated by a rank-1 matrix.

In some embodiments, the decomposition of the composite product Z is a matrix decomposition. One way to find a rank-1 approximation is to perform a singular value decomposition (SVD) of Z and to define the rank-1 estimate by the dominant singular value and its corresponding vectors That is.

$$SVD(Z) = U\sum V^H = u_1\sigma_1 v_1^H + [\,u_2 \cdots u_N] \begin{bmatrix} \sigma_2 & 0 & 0 \\ \vdots & \ddots & \vdots \\ 0 & 0 & \sigma_N \end{bmatrix} [v_2 \cdots v_N]^H. \quad (7)$$

Other decomposition techniques, such as a QR decomposition, or a Gram-Schmidt orthogonalization, can also be used. That is, the basis vectors can be computed using other techniques. For example, the basis vectors can be obtained by means of Gram-Schmidt orthogonalization or other basis estimation approaches. However, to keep this disclosure consistent it is hereinafter assumed that the SVD as in expression (7) is applied to compute the basis vectors.

If the coupling error Δ is small, i.e., $\|\Delta_{nm}\|<<1$, the signal subspace could be modelled as $$u_1\sigma_1 v_1^H,$$

i.e. the dominant singular mode of Z. The observation matrix is expected to be sparse with many elements close to zero. The coupling structure can therefore be exploited, allowing selection of only part of the elements in Z and thereby reducing the overall computation complexity.

In some embodiments, the transmit calibration weights are defined by the transmit gain values and the receive calibration weights are defined by the receive gain values. Transmit and receive chain calibration to enable coherent beamforming can be achieved by calibrating all transmit antenna chains and receive antenna chains with one given transmit antenna chain and receive antenna chain as reference. Without loss of generality, assume that the first elements of the complex-valued gains of the transmit antenna chains and the receive antenna chains, respectively, are set as $t_1=1$ and $r_1=1$. This first element reference can be used to identify the scaling factor.

In some aspects, the basis vectors provide the amplitude and phase of the transmit and receive calibration terms, i.e., the complex-valued gains of the transmit antenna chains and the receive antenna chains, combined with an unknown complex amplitude and phase scaling. Thus, in some embodiments, the estimated transmit calibration weights and the estimated receive calibration weights are subjected to scaling before being applied as calibration factors. Since $$z \approx u_1\sigma_1 v_1^H$$

when the leakage is low, i.e., when $\|\Delta_{nm}\|<<1$:

$$t\approx\alpha_1 u_1 \text{ and } r\approx\alpha_2\bar{v}_1$$

where $\alpha_1$ and $\alpha_2$ are amplitude scaled phase shifts and $\bar{v}_1$ denotes complex conjugate of $v_1$.

In some aspects, it is assumed that the elements of t and the elements of r follow a similar distribution and that the first elements of t are calibrated with the first elements of r. The scaling terms can then be approximated as $|\alpha_1|=|\alpha_2|=\sqrt{\sigma_1}$. Alternatively, in practice, if the scaling between any other transmit-receive pair, say $r_2/t_2$, is known, then also this relationship can be used to determine the scaling factors for the remaining terms. That is, in some embodiments, the scaling factors used for scaling the estimated transmit calibration weights and the estimated receive calibration weights are estimated by setting the estimated transmit calibration weight for one of the transmit antenna chains 144*m*, 144*n* to unit amplitude and by setting the estimated receive calibration weight for one of the receive antenna chains 146*m*, 146*n* to unit amplitude. Yet alternatively, information of known variations in the transmit antenna chains and the receive antenna chains can be approximated and used as scaling factors.

In some aspects, the sounding is not performed for all antenna pairs. That is, in some embodiments, observations from bi-directional sounding of less than all pairs of antennas 142*m*, 142*n* of the antenna system 140 are present in the composite product Z. In other aspects, the sounding is performed for all antenna pairs. That is, in some embodiments, observations from bi-directional sounding of all pairs of antennas 142*m*, 142*n* of the antenna system 140 are present in the composite product Z. However, even in case where the sounding is performed for all antenna pairs, not all terms need to be kept in Z when the transmit calibration weights and the receive calibration weights are to be estimated. That is in some embodiments, only a subset of the composite product Z is decomposed for estimating the transmit calibration weights and the receive calibration weights. For example, for cases where $\|\Delta_{nm}\|<<1$ does not hold, for example where Δ is in the same order as $S_{nm}$, only terms with a reasonable coupling are kept. Mathematically, this can be achieved by applying a selection matrix that put certain elements to zero. Particularly, in some embodiments, the subset is defined by values of the composite product Z having a magnitude larger than a threshold value. A selection matrix threshold $S_{threshold}$ can be used for this purpose.

Aspects of applying as calibration factors the estimated transmit calibration weights to the transmit antenna chains 144*m*, 144*n* and the receive calibration weights to the receive antenna chains 146*m*, 146*n* will now be disclosed.

Denote by the vector s t the data stream to be transmitted from the N transmit antennas at time instant t, denote by the vector $x_t$ the corresponding precoded signal, and denote by the matrix P the precoder. Then, $x_t$ as compensated for calibration errors by application of $[D_t]^{-1}$ can be written as:

$$x_t=[D_t]^{-1}Ps_t.$$

Similarly, denote by the vector $y_t$ the signal received in the uplink at time instant t as corrupted by additive noise $w_t$, modified by the wireless channel H and compensated for calibration errors by application of $[D_r]^{-1}$. Then:

$$y_t=[D_r]^{-1}(Hx_t+w_t).$$

Note that in the above expressions, $D_t = \mathrm{Diag}[t \approx \alpha_1 u_1]$ and $D_r = \mathrm{Diag}[r \approx \alpha_2 \bar{v}_1]$.

Aspects of how to remove the second right-side member in expression (6), namely $D_r D_t$, so that the expression (6) is closer to a rank 1 matrix will now be disclosed. According to the above, the matrix Z has zeros in its diagonal entries since a transceiver operating in TDD cannot transmit and receive simultaneously. Thus, when trying to estimate the left and right singular vectors of Z, there will always be an error floor. This is not problematic in practice when N is large, since the number of off-diagonal entries, namely $N^2-N$ is much larger than the number of diagonal entries, namely N. However, the following aspects can be applied to further mitigate this.

After the left and right dominant singular vectors from Z have been estimated, another matrix, denoted $Z_1$, can be formed by insertion of the estimated complex-valued gains $t_n$, $r_n$ of the N transmit antenna chains 144$m$, 144$n$ and receive antenna chains 146$m$, 146$n$, in the diagonal entries of Z. That is:

$$Z_1 = Z + \hat{D}_{r,0} \hat{D}_{t,0}.$$

Here, $\hat{D}_{r,0}$ and $\hat{D}_{t,0}$ are the estimates of $D_r$ and $D_t$ at iteration 0. The process of estimating the complex-valued gains $t_n$, $r_n$ can then be repeated by estimating the left and right dominant singular vectors from $Z_1$, followed by inserting the thus new estimated complex-valued gains in the diagonal entries of $Z_1$, namely:

$$Z_2 = Z_1 + \hat{D}_{r,1} \hat{D}_{t,1}$$

and re-estimating the left and right dominant singular vectors from $Z_2$. Thus, the process of estimating the complex-valued gains $t_m$, $r_n$ can be iteratively performed with:

$$Z_{k+1} = Z_k + \hat{D}_{r,k} \hat{D}_{t,k}.$$

This procedure can be iteratively performed until $Z_{k+1} \sim Z_k$. In some embodiments, the matrix decomposition is thus iteratively determined $Z_{k+1} = Z_k + \hat{D}_{r,k} \hat{D}_{t,k}$ until $\|Z_{k+1} - Z_k\| < \delta$, where $Z_k$ is the composite product Z for iteration k, where $\hat{D}_{r,k}$ is a diagonal matrix with elements $r_1, r_2, \ldots, r_N$ on its diagonal as determined from $Z_k$, where $\hat{D}_{t,k}$ is a diagonal matrix with elements $t_1, t_2, \ldots, t_N$ on its diagonal as determined from $Z_k$, and where $\delta$ is a threshold value. In this respect, alternating, or convex, projections, for example the Gerchberg-Saxton (GS) algorithm can be applied to iteratively estimate the complex-valued gains $t_n$, $r_n$.

Figure 4:
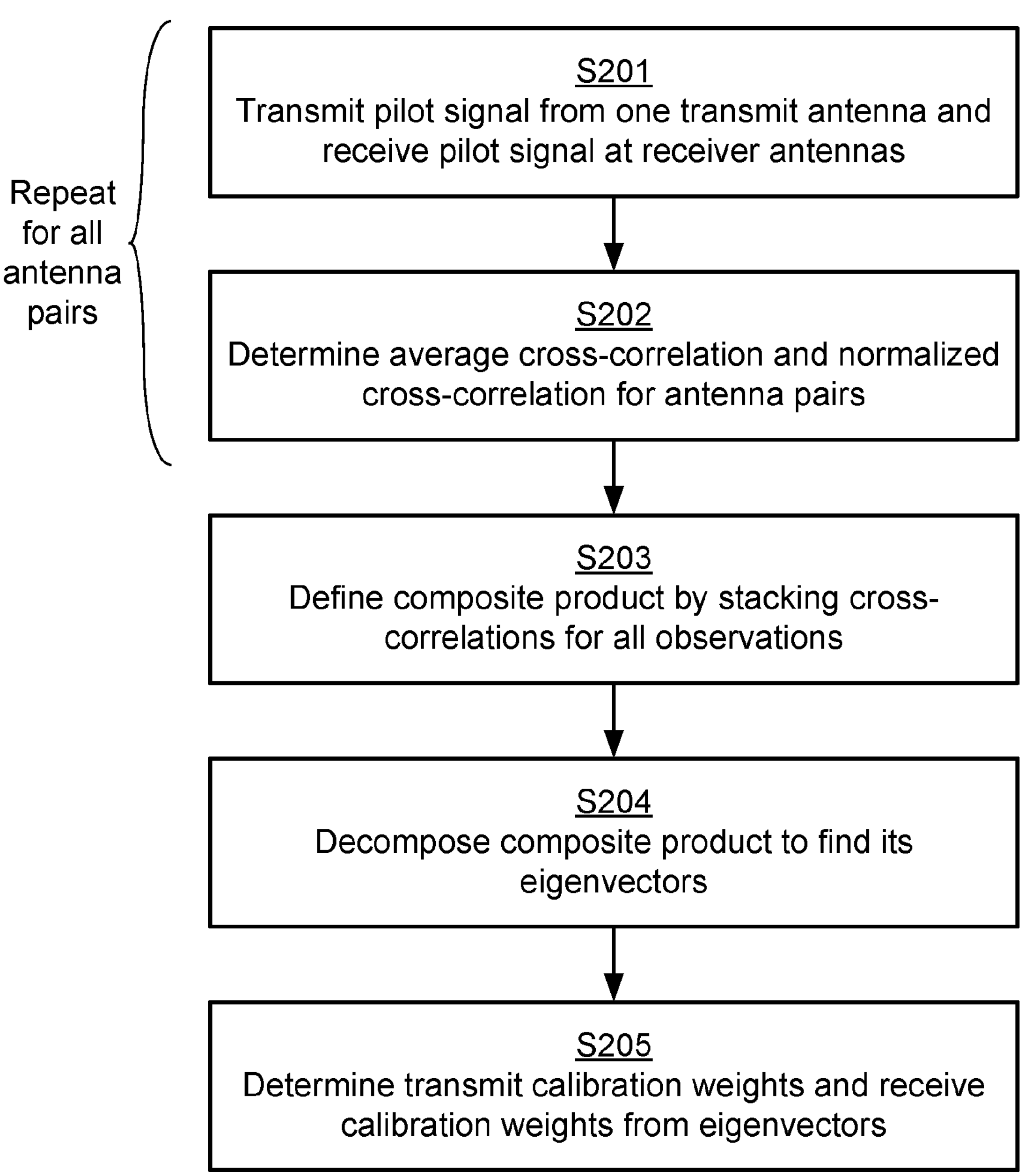

Reference is now made to the flowchart of FIG. 4 for an embodiments a methods for calibrating transmit antenna chains 144$m$, 144$n$ and receive antenna chains 146$m$, 146$n$ of an antenna system 140 based on at least some of the embodiments, aspects, and examples disclosed above.

S201: A known pilot signal $c_m$ is transmitted in digital baseband (frequency/time domain) from transmit antenna m and received at antenna n. The received signal at antenna n is $$x_{nm} = r_n S'_{nm} t_m c_m + w_{nm},$$

where $w_{nm}$ denotes additive noise.

S202: The averaged cross-correlation is determined as $$y_{nm} \approx r_n S'_{nm} t_m$$

and the cross-correlation normalized by the S parameters (i.e., by $S_{nm}$) is determined as $$z_{nm} = \frac{y_{nm}}{s_{nm}} = r_n (1 + \Delta_{nm}) t_m.$$

Actions S201 and S202 are repeated for all antenna pairs.

S203: The normalized cross-correlations from all observations are stacked in column vectors $z_m$ and then all column vectors are stacked, yielding an N×N matrix Z that defines a composite product.

S204: The matrix Z is decomposed, for examples using SVD;

$$SVD(Z) = U \sum V^H = u_1 \sigma_1 v_1^H + [u_2 \cdots u_N] \begin{bmatrix} \sigma_2 & 0 & 0 \\ \vdots & \ddots & \vdots \\ 0 & 0 & \sigma_N \end{bmatrix} [v_2 \cdots v_N]^H.$$

The first left and right singular vectors of Z, i.e., $u_1$ and $v_1$ are extracted.

S205: The transmit calibration weights are found as $t \approx \alpha_1 u_1$ and the receive calibration weights are found as $r \approx \alpha_2 \bar{v}_1$, where $\alpha_1$ and $\alpha_2$ are amplitude scaled phase shifts.

Figure 5:
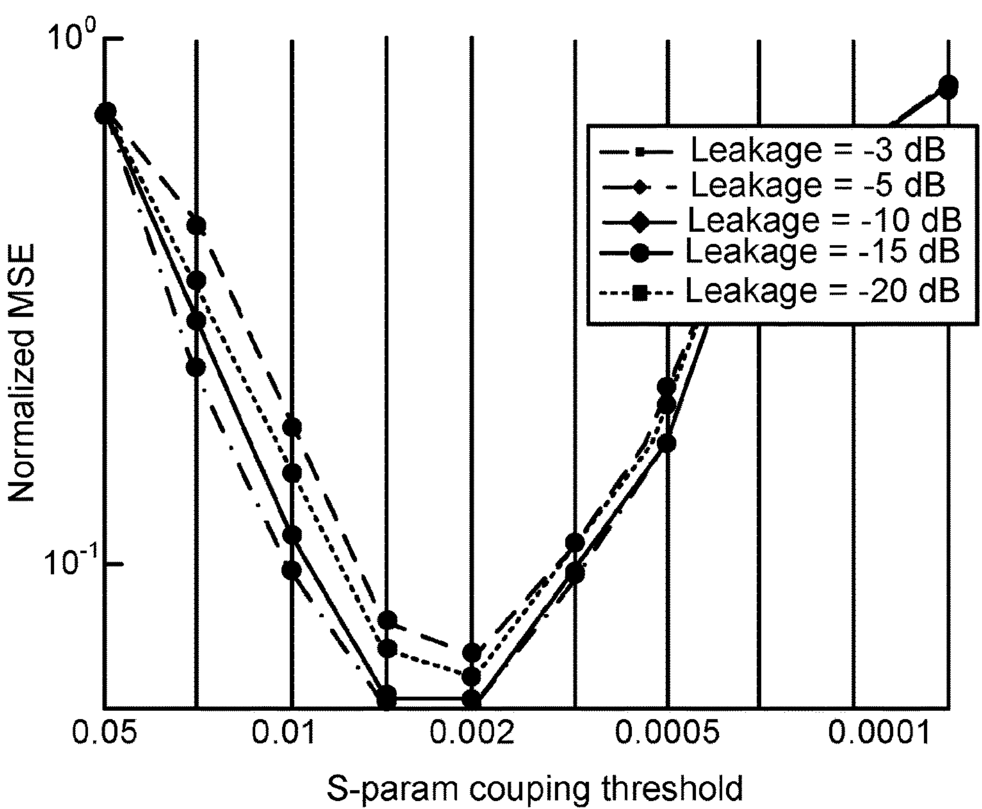
FIGS. 5 and 6 show simulation results according to embodiments.
Figure 6:
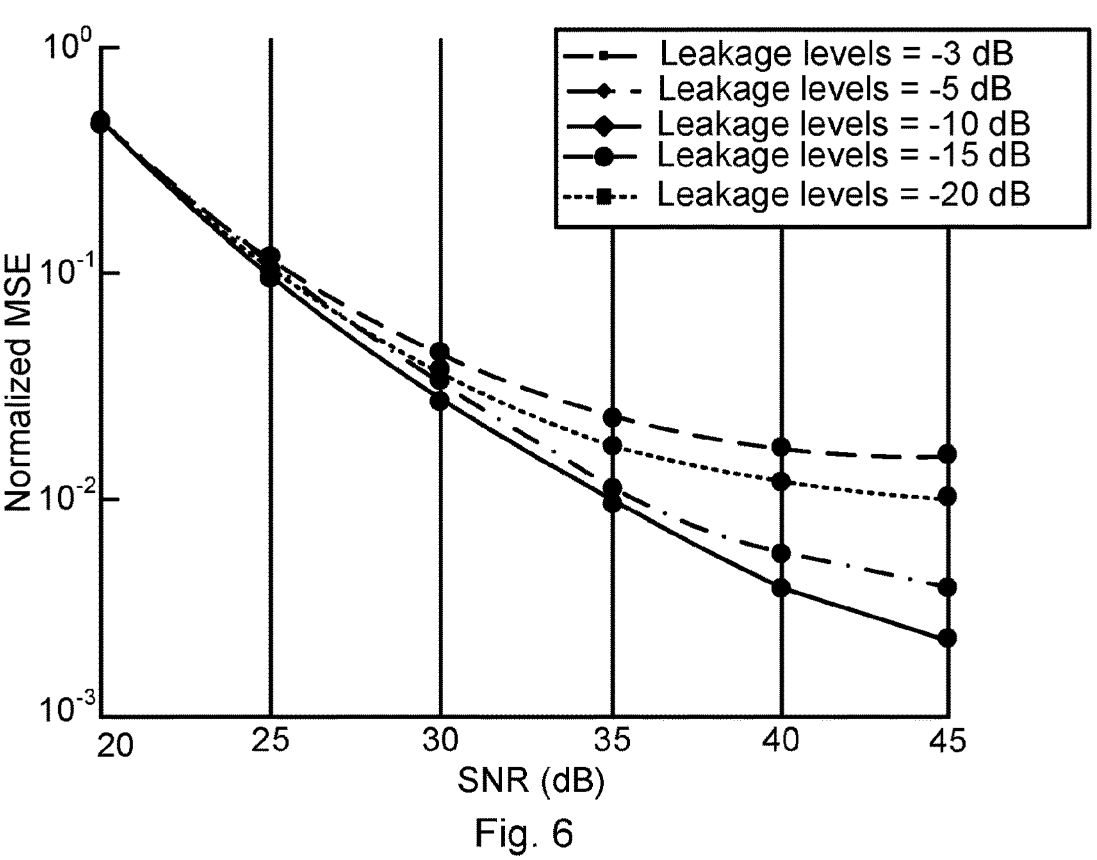

Reference is now made to FIG. 5 and FIG. 6 which show simulation results. FIG. 5 shows simulation results in terms of normalized mean squared error (MSE) as a function of values of $S_{threshold}$ for different leakage levels $$S_{nm}^{leak}.$$

FIG. 6 shows simulation results in terms of normalized MSE as a function of SNR for different leakage levels $$S_{nm}^{leak}.$$

The simulation results are in FIG. 5 and FIG. 6 shown for an antenna system 140 where mutual coupling levels $S_{nm}$ are defined by the S parameters. In the presence of leakage, the actual S parameters are $$\left(S_{nm} + s_{nm}^{leak}\right) = S_{nm}(1 + \Delta_{nm}), \text{ where } \Delta_{nm} = \frac{s_{nm}^{leak}}{s_{nm}}.$$

Typically, the leakage terms follow a complex Gaussian distribution:

$$S_{nm}^{leak} \approx CN\left(0, \sigma_{leak}^2 |S_{nm}|\right),$$

where $$\sigma_{leak}^2$$

denotes the leakage variance levels. To improve the accuracy of the results, the received signals obtained from antennas when the S parameter levels are below a threshold are ignored. That is:

$$x_{nm} = r_n S'_{nm} t_m c_n + w_{nm} \approx x_{nm} \text{ if } S_{nm} < S_{threshold}.$$

In the simulations, $$\frac{|s_{threshold}|}{\max|s_{nm}|} < -30 \text{ dB}.$$

runner, the normalized MSE is defined as below for the transmitter (TX) and receiver (RX), respectively:

$$MSE_{TX} = 1 - \frac{E\{\hat{t}^H t\}}{\sqrt{Er\{\hat{t}^H t\}E\{t^H t\}}} \text{ and}$$

$$MSE_{RX} = 1 - \frac{E\{\hat{r}^H r\}}{\sqrt{E\{\hat{r}^H \hat{r}\}E\{r^H r\}}}.$$

Typically, the error vector magnitude (EVM) is the normalized root mean squared error, and should follow the MSE values.

Figure 7:
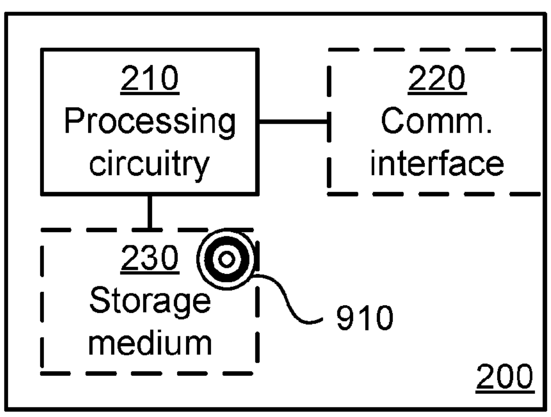
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or actions, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, functions, nodes, and devices, as disclosed above with reference to FIG. 1. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
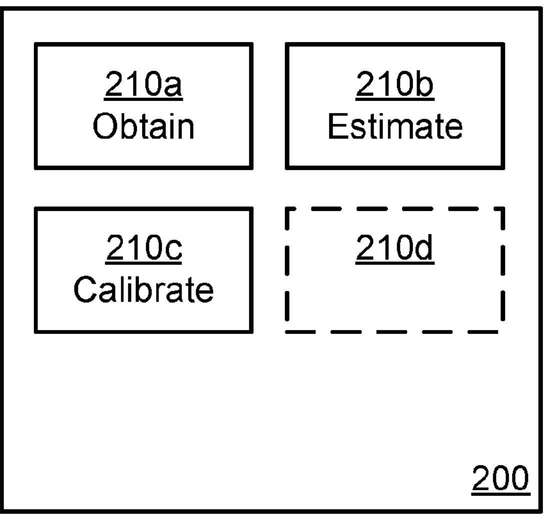
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; an obtain module 210*a* configured to perform action S102, an estimate module 210*b* configured to perform action S104, and a calibrate module 210C configured to perform action S106. The network node 200 of FIG. 8 may further comprise a number of optional functional modules, as represented by functional module 210*d*. In general terms, each functional module 210*a*:210*d* may in one embodiment be implemented only in hardware and in another embodiment with the help of software, i.e., the latter embodiment having computer program instructions stored on the storage medium 230 which when run on the processing circuitry makes the network node 200 perform the corresponding actions mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210*a*:210*d* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*:210*d* and to execute these instructions, thereby performing any actions as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210*a*:210*d* of FIG. 8 and the computer program 920 of FIG. 9.

Figure 9:
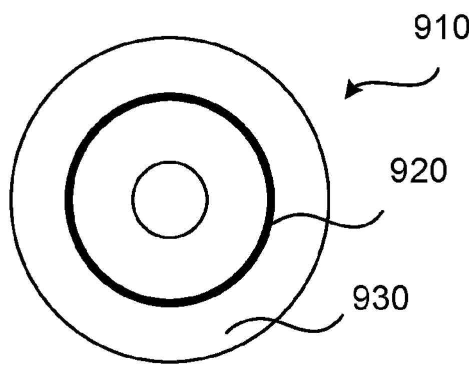
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any actions as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

Figure 10:
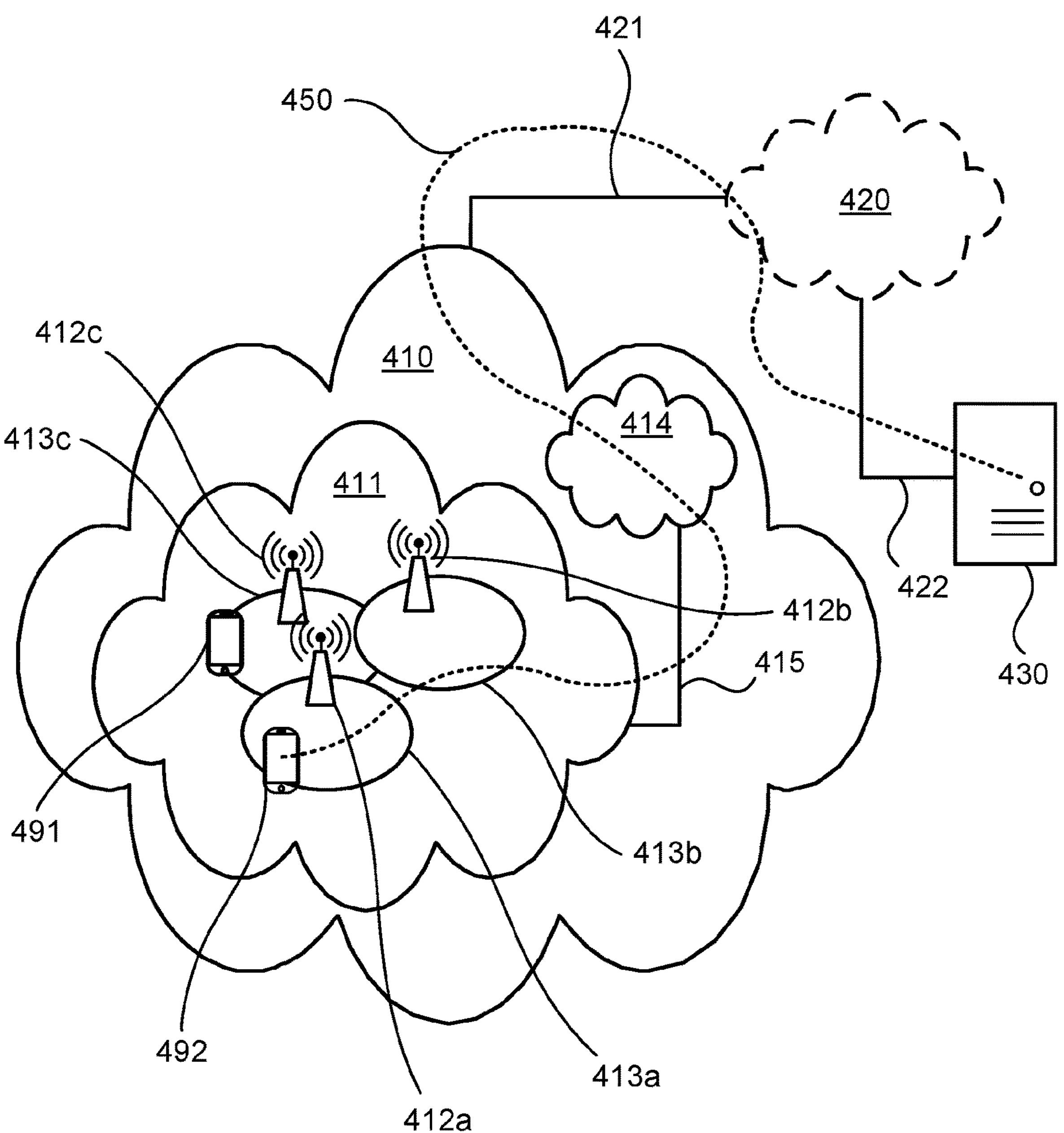
FIG. 10 is a schematic diagram illustrating a telecommunication network connected via an intermediate network to a host computer in accordance with some embodiments.

FIG. 10 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network no in FIG. 1, and core network 414, such as core network 120 in FIG. 1. Access network 411 comprises a plurality of radio access network nodes 412*a*, 412*b*, 412*c*, such as NBs, eNBs, gNBs (each corresponding to the network node 200 of FIG. 1) or other types of wireless access points, each defining a corresponding coverage area, or cell, 413*a*, 413*b*, 413*c*. Each radio access network nodes 412*a*, 412*b*, 412*c* is connectable to core network 414 over a wired or wireless connection 415. A first UE 491 located in coverage area 413*c* is configured to wirelessly connect to, or be paged by, the corresponding network node 412*c*. A second UE 492 in coverage area 413*a* is wirelessly connectable to the corresponding network node 412*a*. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the user equipment 160 of FIG. 1.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 11:
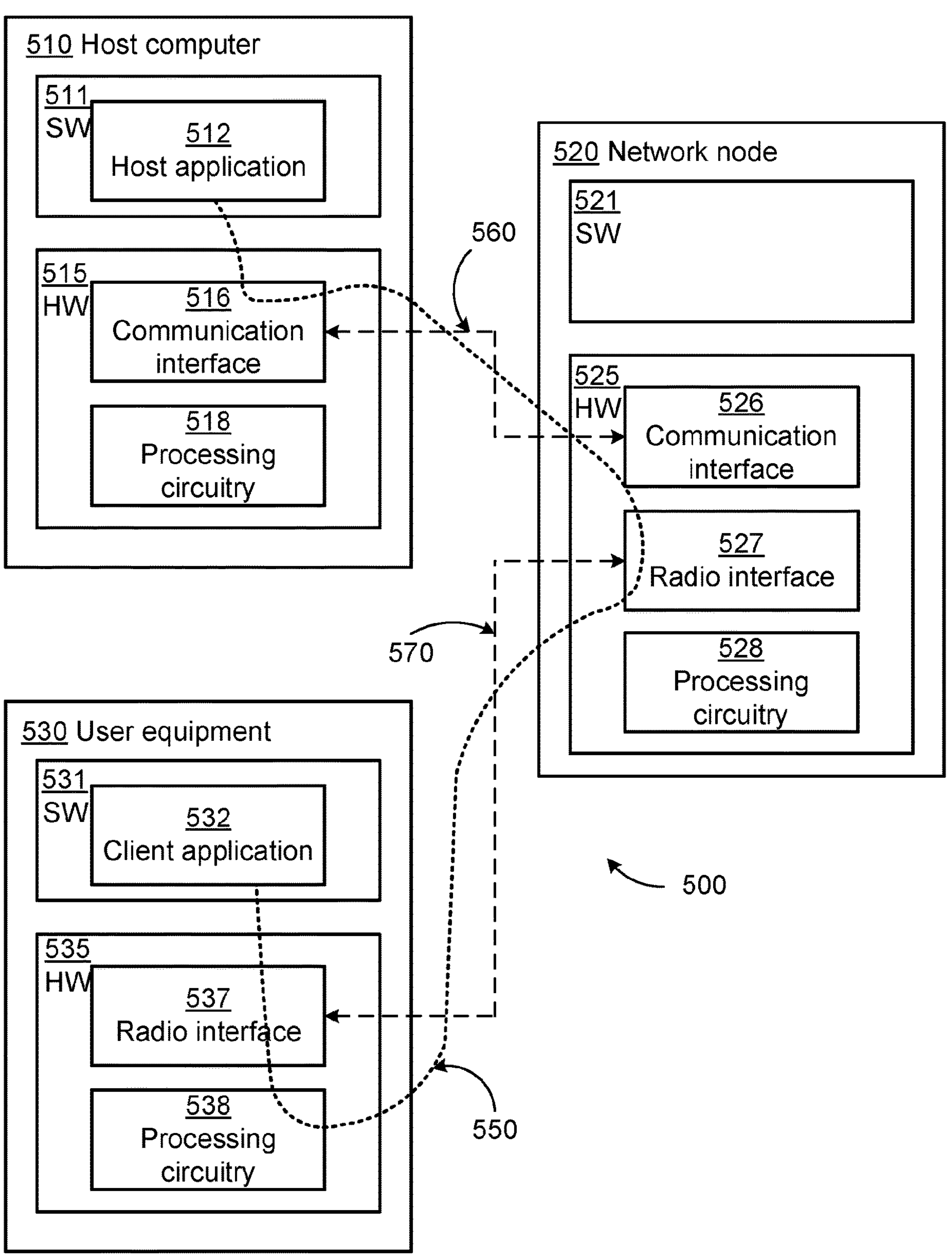
FIG. 11 is a schematic diagram illustrating host computer communicating via a radio base station with a terminal device over a partially wireless connection in accordance with some embodiments.

FIG. 11 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the user equipment 160 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 200 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by radio access network node 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 11 may be similar or identical to host computer 430, one of network nodes 412*a*, 412*b*, 412*c* and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for calibrating transmit antenna chains and receive antenna chains of an antenna system, the method being performed by a network node, the method comprising:

obtaining a set of observations from bi-directional sounding of pairs of antennas of the antenna system, wherein each of the antennas has one transmit antenna chain and one receive antenna chain, and wherein the observations are represented by a composite product z of transmit calibration weights, receive calibration weights, and signal leakage terms;

estimating the transmit calibration weights and the receive calibration weights from a decomposition of the composite product z; and calibrating the transmit antenna chains and the receive antenna chains by applying the estimated transmit calibration weights to the transmit antenna chains and the receive calibration weights to the receive antenna chains as calibration factors.

2. The method according to claim 1, wherein the composite product z is composed of normalized cross-correlation terms obtained for a set of antennas of the antenna system, wherein each normalized cross-correlation term represents bi-directional sounding of a respective pair of antennas of the antenna system.

3. The method according to claim 2, wherein normalized cross-correlation term $z_{nm}$ represents normalized cross-correlation between antenna n and antenna m of the antenna system for transmission of a signal $c_m$ from antenna m and reception of the signal $c_m$ at antenna n.

4. The method according to claim 3, wherein the signal $c_m$ is dedicated for the bi-directional sounding.

5. The method according to claim 2, wherein normalized cross-correlation term $z_{nm}$ is a function of a transmit gain value $t_m$ of antenna m, a receive gain value $r_n$ of antenna n, and a signal leakage term $\Delta_{nm}$ between antenna n and antenna m.

6. The method according to claim 5, wherein the normalized cross-correlation term $z_{nm}$ is defined as $$z_{nm}=r_n(1+\Delta_{nm})t_m.$$

7. The method according to claim 6, wherein the composite product z is defined as:

$$Z=\mathrm{Diag}\begin{bmatrix} r_1 \\ r_2 \\ \vdots \\ r_N \end{bmatrix}\begin{bmatrix} 0 & 1+\Delta_{12} & \cdots & 1+\Delta_{1N} \\ 1+\Delta_{21} & \ddots & \ddots & \vdots \\ \vdots & \ddots & \ddots & 1+\Delta_{N-1N} \\ 1+\Delta_{N1} & 1+\Delta_{N1} & \cdots & 0 \end{bmatrix}\mathrm{Diag}\begin{bmatrix} t_1 \\ t_2 \\ \vdots \\ t_N \end{bmatrix},$$

where Diag $$\mathrm{Diag}\begin{bmatrix} x_1 \\ x_2 \\ \vdots \\ x_N \end{bmatrix}$$

is a diagonal matrix with elements $x_1, x_2, \ldots, x_N$ on its diagonal.

8. The method according to claim 1, wherein the transmit calibration weights are defined by the transmit gain values and the receive calibration weights are defined by the receive gain values.

9. The method according to claim 1, wherein observations from bi-directional sounding of all pairs of antennas of the antenna system are present in the composite product Z or, wherein observations from bi-directional sounding of less than all pairs of antennas of the antenna system are present in the composite product z.

10. The method according to claim 1, wherein only a subset of the composite product z is decomposed for estimating the transmit calibration weights and the receive calibration weights.

11. The method according to claim 10, wherein the subset is defined by values of the composite product z having a magnitude larger than a threshold value.

12. The method according to claim 1, wherein the estimated transmit calibration weights and the estimated receive calibration weights are subjected to scaling before being applied as calibration factors.

13. The method according to claim 12, wherein scaling factors used for scaling the estimated transmit calibration weights and the estimated receive calibration weights are estimated by setting the estimated transmit calibration weight for one of the transmit antenna chains to unit amplitude and by setting the estimated receive calibration weight for one of the receive antenna chains to unit amplitude.

14. A network node for calibrating transmit antenna chains and receive antenna chains of an antenna system, the network node comprising processing circuitry, the processing circuitry being configured to cause the network node to:

obtain a set of observations from bi-directional sounding of pairs of antennas of the antenna system, wherein each of the antennas has one transmit antenna chain and one receive antenna chain, and wherein the observations are represented by a composite product z of transmit calibration weights, receive calibration weights, and signal leakage terms;

estimate the transmit calibration weights and the receive calibration weights from a decomposition of the composite product z; and calibrate the transmit antenna chains and the receive antenna chains by applying the estimated transmit calibration weights to the transmit antenna chains and the receive calibration weights to the receive antenna chains as calibration factors.

15. The network node according to claim 14, wherein the composite product Z is composed of normalized cross-correlation terms obtained for a set of antennas of the antenna system, wherein each normalized cross-correlation term represents bi-directional sounding of a respective pair of antennas of the antenna system.

16. A computer program product for calibrating transmit antenna chains and receive antenna chains of an antenna system, the computer program product comprising a non-transitory computer readable medium storing computer code which, when run on processing circuitry of a network node, causes the network node to:

obtain a set of observations from bi-directional sounding of pairs of antennas of the antenna system, wherein each of the antennas has one transmit antenna chain and one receive antenna chain, and wherein the observations are represented by a composite product z of transmit calibration weights, receive calibration weights, and signal leakage terms;

estimate the transmit calibration weights and the receive calibration weights from a decomposition of the composite product z; and calibrate the transmit antenna chains and the receive antenna chains by applying the estimated transmit calibration weights to the transmit antenna chains and the receive calibration weights to the receive antenna chains as calibration factors.

* * * * *